June 30, 1970  C. L. GRAYBILL  3,517,651
ROTARY TWO-CYCLE ENGINE
Filed March 11, 1969  6 Sheets-Sheet 3

INVENTOR.
Clinton L. Graybill
BY
Wells & St John
Attys.

June 30, 1970  C. L. GRAYBILL  3,517,651
ROTARY TWO-CYCLE ENGINE
Filed March 11, 1969  6 Sheets-Sheet 4
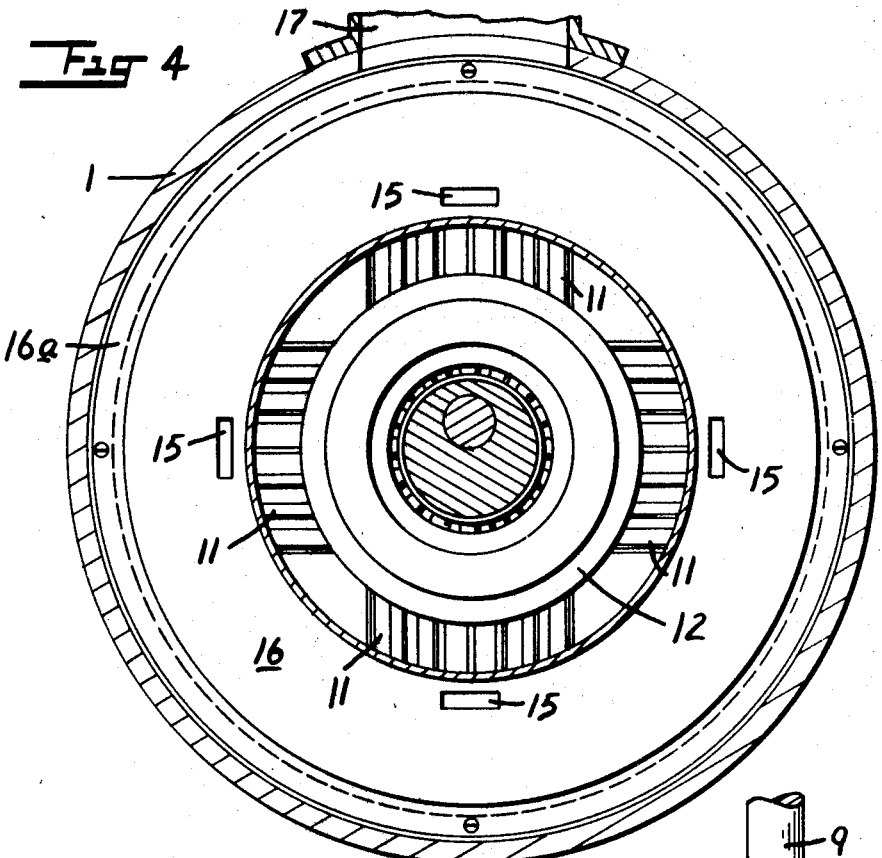
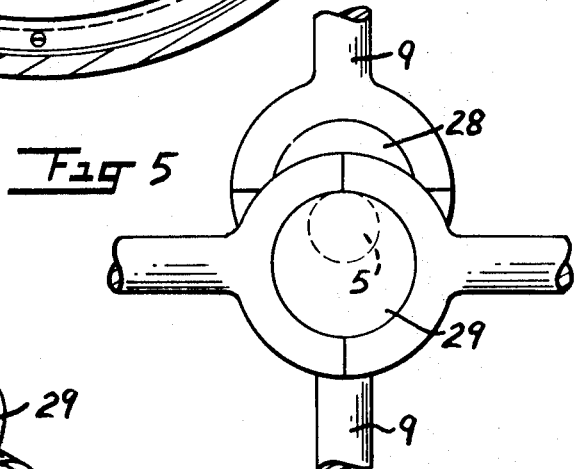
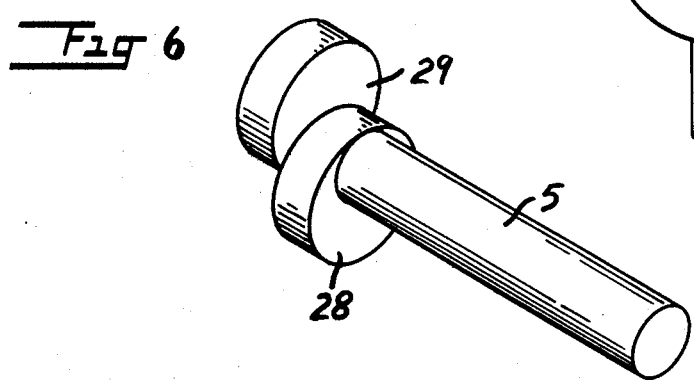
INVENTOR.
CLINTON L. GRAYBILL
BY Wallos & H John
ATTYS.

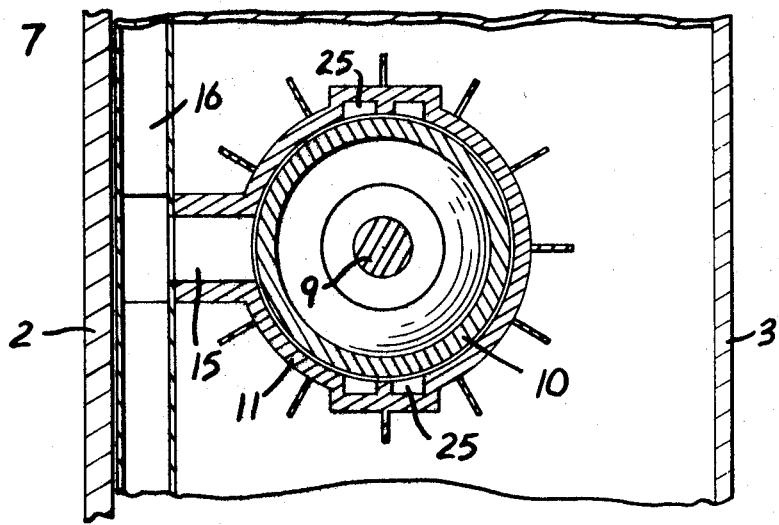
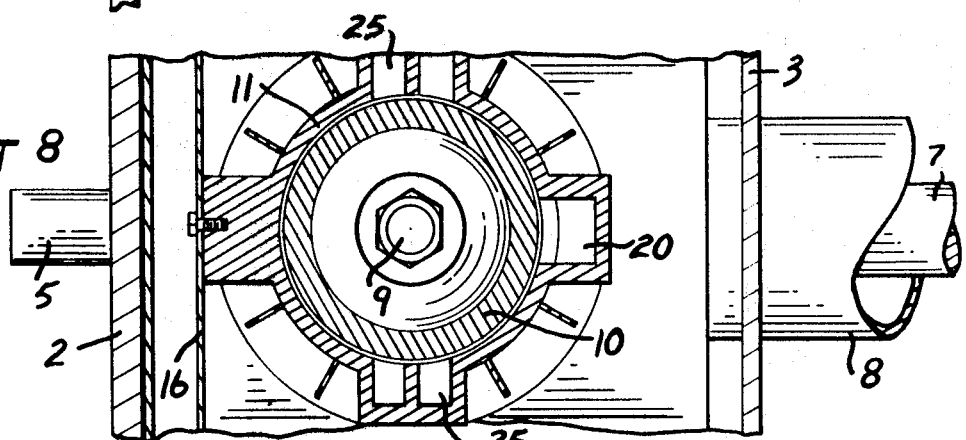
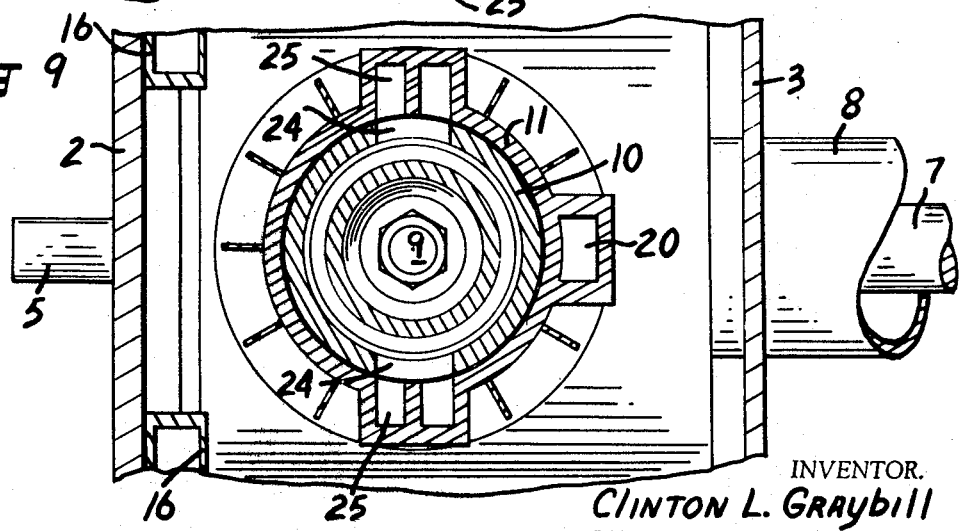

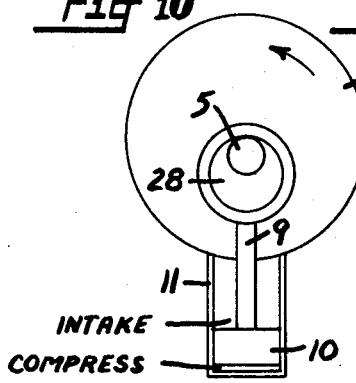
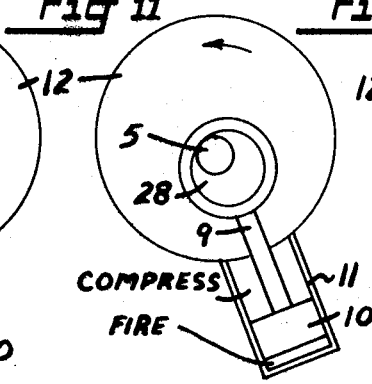
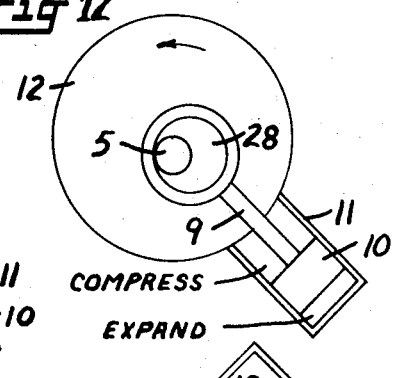
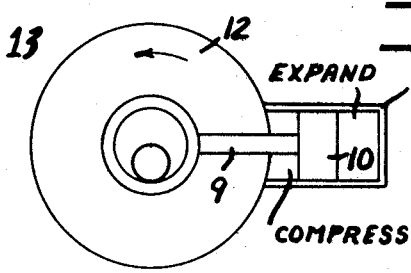
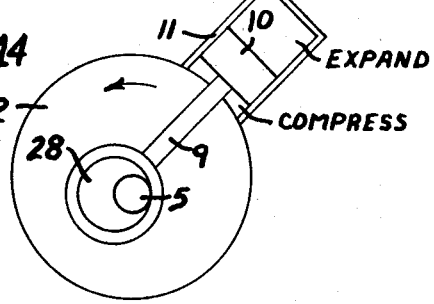
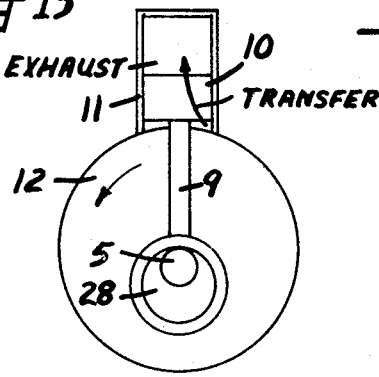
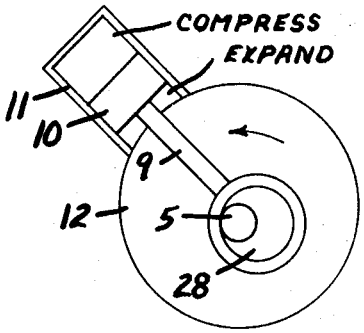
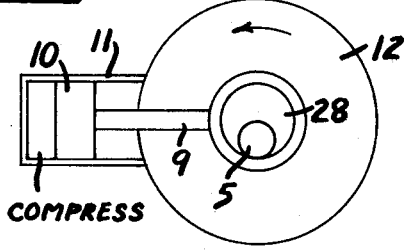
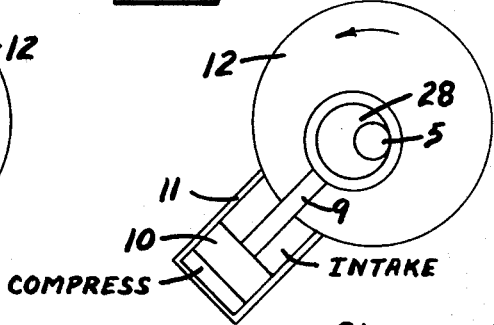

United States Patent Office 3,517,651
Patented June 30, 1970

3,517,651
ROTARY TWO-CYCLE ENGINE
Clinton L. Graybill, Superior, Mont., assignor to Graybill Industries, Inc., Superior, Mont., a corporation of Montana
Filed Mar. 11, 1969, Ser. No. 806,254
Int. Cl. F02b 57/06
U.S. Cl. 123—44       7 Claims

ABSTRACT OF THE DISCLOSURE

A rotary engine is provided wherein a stationary casing has two pairs of cylinders mounted therein at right angles to each other upon bearings within the casing. A power delivery shaft is affixed to the cylinders and fits close to the casing wall so as to feed all exhaust gases to an exhaust outlet on the casing. Fuel gas is introduced to a central chamber and from this chamber into the cylinders through passages that enter the cylinders intermediate their ends. Pistons are slidable in the cylinders and the pistons in opposite cylinders are connected to each other by rigid piston rods extending along the axes of the cylinders. The pairs of opposite cylinders are offset axially of the shaft so their piston rods clear each other. The pistons are cup shaped and have skirts which, when the piston is extended almost to the outer end of its cylinder, uncovers an inlet in the side of the cylinder to admit gas into the interior of the piston and into the cylinder between the piston and the inner end of the cylinder. The reciprocation of the pistons within their cylinders is controlled by two oppositely disposed like eccentric cams on an idler shaft that is offset with respect to the power delivery shaft and rotatably supported in the casing.

Background of invention

It is known to have internal combustion engines wherein two or more cylinders rotate about a central axis that is perpendicular to the cylinder axes and the pistons are reciprocated in the cylinders by rotating them about an axis that is offset with respect to the axis about which the cylinders rotate. Examples of such devices are found in the United States Pat. No. 2,683,422 to A. Z. Richards, Jr. and in the United States Pat. No. 3,200,797 to Dillenberg.

Purpose of the invention

The present invention utilizes the basic principle that is present in the patents mentioned above. It is a purpose of the invention to provide an internal combustion engine of the type referred to wherein the power delivery shaft of the engine and central support drum for the cylinders are fixed together and supported in the casing on bearings provided by the casing and the power delivery shaft projects from the casing for connection to whatever device is to be driven, the entire shaft, drum and cylinder unit serving as a flywheel in effect to maintain smooth power flow through the shaft to the driven device.

It is a further purpose of this invention to provide an engine of the character described wherein the pistons in the four cylinders are controlled by an idler shaft having two oppositely disposed eccentric cams fixed thereto, each effecting reciprocation of the pistons in one pair of oppositely disposed cylinders, so that the two pairs of oppositely disposed cylinder-piston units maintain their balanced relation at all times with no gearing interposed.

Another purpose of the invention is to provide a new combination, in an engine of the character described, of cylinder, piston, gas transfer parts and fuel gas inlet means whereby the piston pre-compresses the fuel gas in one end of the cylinder during the explosion stroke to enhance the scavenging action to clear the other end of the cylinder of the burned fuel, and, the entire operation uses only the pistons as moving valves.

General description

An internal combustion two cycle engine embodying my invention in its preferred form is shown in the accompanying drawings wherein;

FIG. 4 is a sectional view on a reduced scale taken on the line 4—4 of FIG. 1;

FIG. 5 is a detail view taken on the line 5—5 of FIG. 1;

FIG. 6 is a perspective view of the floating camshaft employed;

FIG. 7 is a sectional view taken on the line 7—7 of FIG. 1;

FIG. 8 is a sectional view taken on the line 8—8 of FIG. 1;

FIG. 9 is a sectional view taken on the line 9—9 of FIG. 1; and

FIGS. 10–18 are diagrammatic views depicting the relative positions of a rotating cylinder and its piston throughout a complete cycle of operation.

Figure 1:
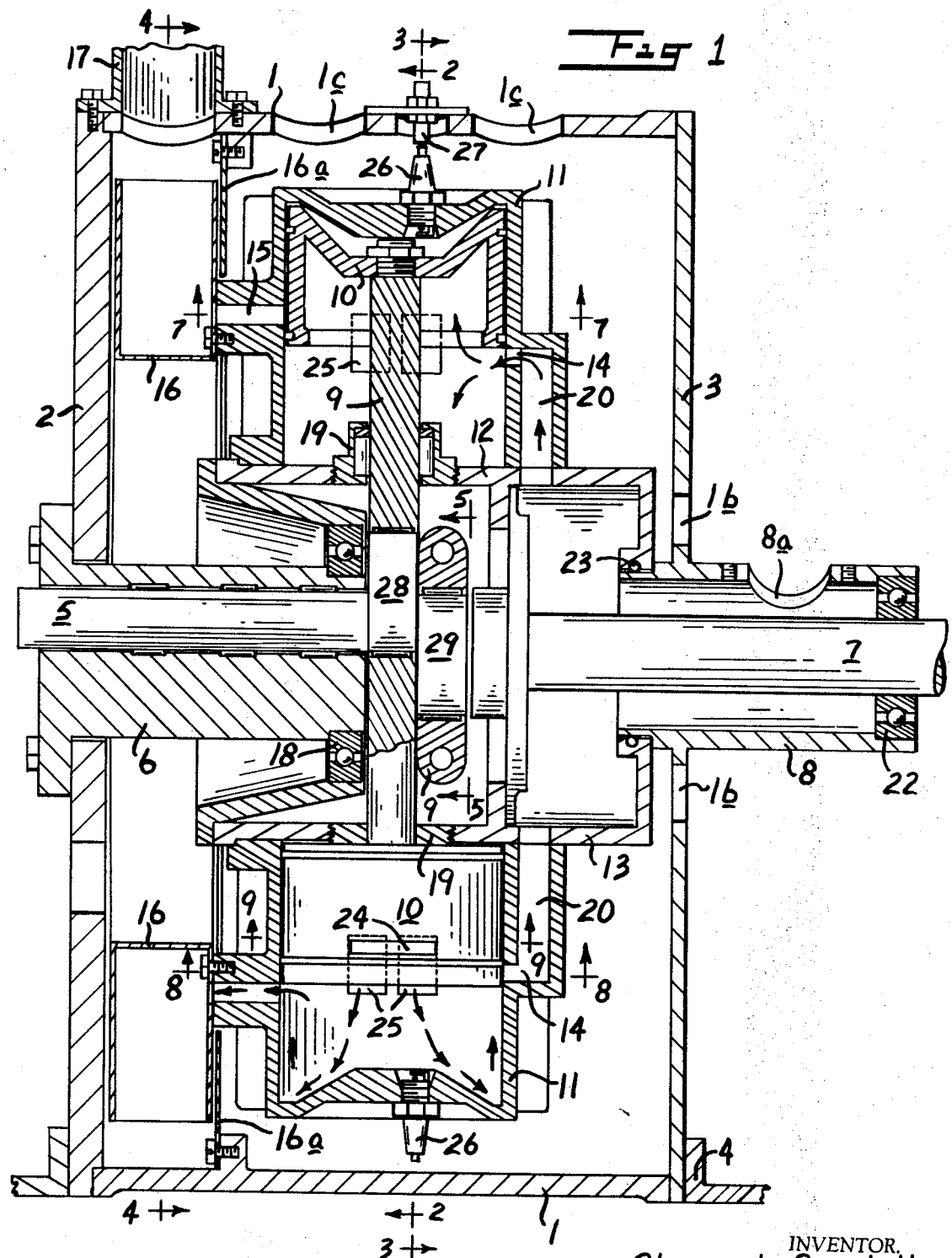
FIG. 1 is a sectional view taken centrally through the engine on a plane including the axis of the power delivery shaft for the engine.

Referring now in detail to the drawings, a description of the preferred form of the invention will be given. The major parts of the invention include a stationary casing 1 having a back cover 2 and a front cover 3. Mounting feet 4 are provided on the casing 1, although it will be evident as the description proceeds that the engine may be mounted with the power delivery shaft extending in any direction from horizontal to vertical. The shafting of the engine comprises a floating camshaft 5 which is supported by a block 6 on the back cover 2, and a power delivery shaft 7, which is mounted in a housing 8 that is carried by the front cover plate 3.

The engine utilizes four cylinders 11 arranged in diametrically opposed pairs, the pairs being 90 degrees apart about the axis of the power delivery shaft 7 to which all of the cylinders are rigidly connected as will later appear. The cylinder pairs are offset axially of the shaft 7 sufficiently to provide clearance between two connecting rods 9, each of which has a piston 10 at each end. The cylinders have inlet passages 14 for fuel gas and outlet passages 15 for the exhaust of gas. A shield ring 16 is carried by the cylinders 11 and a baffle 16a is secured on the casing 1 to direct the exhaust gas to a discharge conduit 17 on the casing cover 2. The four cylinders 11 are mounted upon a crankcase 12 and the connecting rods go through closures 19 into the crankcase. The block 6 carries a bearing 18 on which the crankcase 12 is journalled. The housing 8 carries a bearing 22 for the shaft 7. The housing 8 also has a sealing ring 23 which receives an extension 13 of the crankcase 12. This extension 13 forms a rotating gas chamber. Gas inlets 20 thereon lead to the cylinders 11.

The fuel gas is fed into the housing 8 from a suitable carburetor (not shown) which fits over an opening 8a in the housing 8. The fuel gas enters the cylinders 11 slightly closer to the crankcase than to the outer end of the cylinder. When a piston is at its outermost position the passage 14 is uncovered so that fuel gas is drawn into the cylinder 11. The pistons 10 are cups that provide, with the interior of the cylinder between the piston 10 and the crankcase 12, space for a substantial amount of fuel gas. Each piston 10 has two passages 24 in its side wall adjacent to the closed end of the piston. These passages are positioned to move across bypass channels 25 that are provided in each cylinder wall so that when a piston 11 is in the position shown in the lower portion of FIG. 1, the fuel gas compressed between the piston and crankcase can flow through the passages 24 and the channels 25 into the area between the head of the piston 10 and the outer end of the cylinder 11. The inlet passage 14 is covered by the skirt of the piston 10 in this position of the piston. The exhaust passage 15 is uncovered in this position of the piston so that the inrushing fuel gas scavenges the combustion area within the cylinder and forces exhaust gases therein through the passage 15. As the piston 10 moves from the position at the bottom of FIG. 1 to the position at the top of FIG. 1, it first closes the channels 25, then closes the passage 15, and then compresses the fuel gas in the outer end portion of the cylinder 11. In the final compression position of the piston the passage 14 is fully open so that fuel gas rushes into the area between the piston 10 and the crankcase 12 within the cylinder to relieve the vacuum therein.

The drawings show spark plugs 26 in the outer end of each cylinder. These plugs sweep past a contact point 27 on the casing which is connected to a high voltage source so as to cause a spark inside the cylinder 11.

Figure 2:
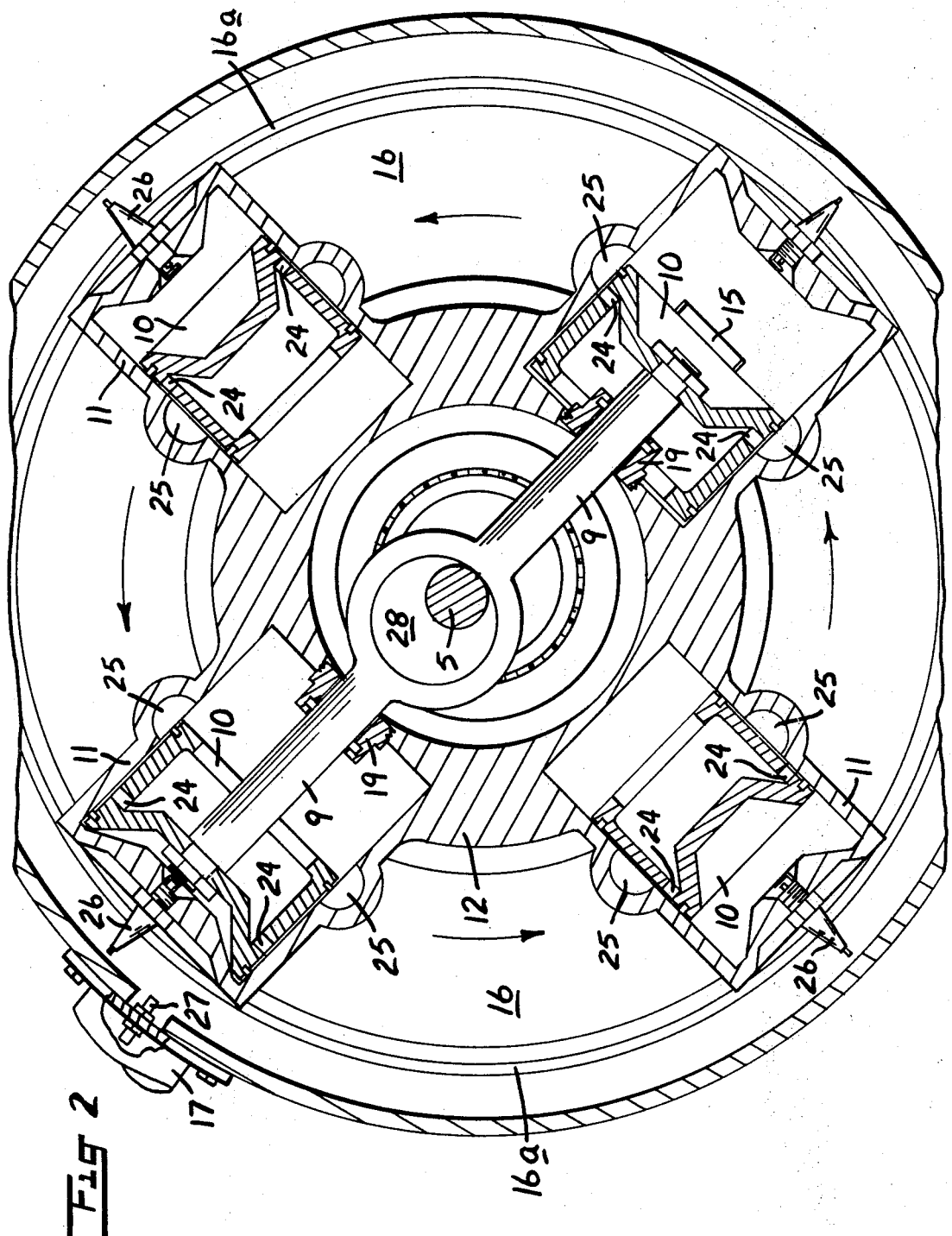
FIG. 2 is a sectional view taken on the line 2—2 of FIG. 1, with some details left out for the sake of clarity.
Figure 3:
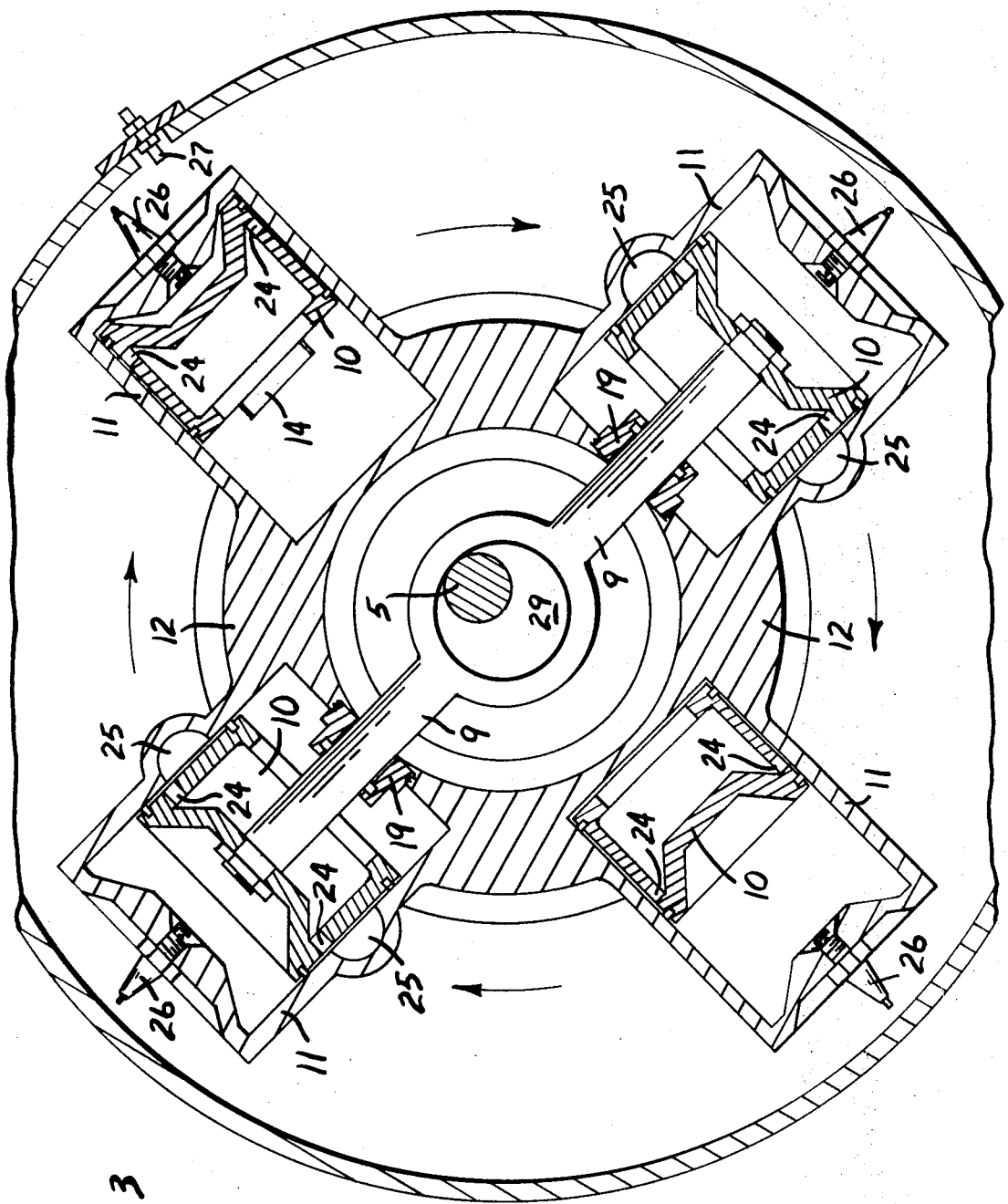
FIG. 3 is a sectional view taken on substantially the line 3—3 looking in the opposite direction of FIG. 2.

The principle as described in the Richards Pat. No. 2,683,422 is generally followed in obtaining rotation of the cylinders 11 and through them the rotation of the crankcase 12 and the power delivery shaft 7 which is rigidly connected to the crankcase 12. The piston connecting rods 9 are rotatably mounted on two like oppositely disposed eccentric cams 28 and 29 that are formed on the shaft 5 and are cylindrical. These eccentric cams have radii which are one-fourth of the travel of the pistons they control in the respective cylinders. Placing the cams 28 and 29 directly opposite each other balances them on the shaft 5. Referring now to FIG. 2 where the parts are shown with a cylinder moving into position to bring its spark plug 26 into contact with the contact point 27 it is evident that, upon firing, the piston 10 will move inward and the resultant forces will rotate the cylinders 11 in the direction of the arrows in FIG. 2. As each cylinder 11 moves past the point 27 the firing of that cylinder is accomplished. The shaft 5 needs no connection to the shaft 7 to maintain their relative speeds of rotation at a ratio of two revolutions of the shaft 5 to one of the shaft 7. FIG. 3 illustrates the position of the cam 29 when the cam 28 is in the position shown in FIG. 2.

In FIGS. 7, 8 and 9 the relative positions of the pistons 10 are shown at the time of firing the compressed gas in the uppermost cylinder of FIG. 1. Fresh fuel gas has filled the space in the top cylinder 11 inwardly of the piston and the exhaust passage 15 is closed. In the lowermost cylinder 11 the passage 14 is closed by the lower piston 10 as shown by FIG. 8. The compressed fuel gas trapped inside the lower piston is escaping through the passages 24 to the channels 25 in the lower cylinder 11 as shown by FIG. 9, and is sweeping the exhaust gases out of this cylinder through its exhaust passage 15.

In FIGS. 10 to 18 the progress of one cam 28, the corresponding cylinder 11 and the crankcase 12 during a full cycle is shown with suitable notations as to what is happening. Note that, while the cylinder 11 is moving 180 degrees from final compression of the charge to exhaust of the charge, the piston 10 and the cam 28 have completed a 360 degree revolution as illustrated in FIG. 15.

In the cycle of each cylinder 11 starting at full compression as illustrated in FIGS. 1 and 2, and diagrammatically in FIG. 10, the piston 11 is at its greatest distance from the center line of the shaft 5. The spark plug 26 is almost to the contact point 27. When the spark plug advances to the point 27 ignition of the fuel gas compressed between the head of the cylinder 11 and the piston 10 takes place. The expansion of the burning fuel gas forces the piston 10 away from the cylinder head and in doing so, a torque is exerted on the cylinder to turn it to the left as shown in FIG. 2. Endwise pressure on this piston 10 also forces the cam 28 to rotate about the axis of the shaft 5 while the cylinder 11 is rotating about the axis of the shaft 7.

With this engine construction one of the real advantages lies in the avoidance of any valves. It is obvious that the parts or passages 24 in the pistons 10 cooperate with the channels 25 to transfer the fuel gas out from within the piston to the interior of the cylinder. It should be noted too, that the flow of the incoming fuel is in general outward so that centrifugal force helps the fuel flow. Also the exhaust gases are hotter and lighter than the unexploded fuel gas. Thus when the fuel gas is released through the passages 24 and the channels 25 its higher specific gravity causes it to move outward, displacing the burned gases through the exhaust passages 15 to the shield ring 16 which is open on its face toward the plate 2. In all movement of the gases through the engine advantage is taken of the centrifugal force to advance the gases.

The cylinders 11 are finned to aid in cooling. The fuel gas itself acts as a coolant as its temperature is raised in its movement from the inlet at 8a through 13. The casing 1 may also be provided with air inlets at 1a and 1b and outlets at 1c to allow air to be drawn through the casing 1 by the fan like action of the rotating cylinders.

It is believed that the nature and advantages of my invention will be clear from the foregoing description.

Having described my invention, I claim:

1. An internal combustion engine having in combination:

a power delivery shaft;

a casing having bearings for rotatably supporting the power delivery shaft;

a crank case in said casing affixed to said power delivery shaft and supported by the casing for rotation about the axis of said shaft;

two pairs of oppositely directed aligned cylinders secured on said crank case, the pairs being at right angles to each other with their axes intersecting the axis of said shaft;

a camshaft parallel to the power delivery shaft and journalled in said casing;

said cam shaft carrying two oppositely disposed like circular cams fixed thereon;

each cam having its center offset in a direction perpendicular to the axis of said camshaft the same amount as the other cam;

said cam shaft having its axis offset with respect to the axis of the power delivery shaft an amount equal to the offset of each cam center from the camshaft axis;

a piston rod journalled on one cam and extending into both cylinders of one of said pairs of cylinders;

a second piston rod journalled on the other cam and extending into both cylinders of the other pair of cylinders;

a hollow cup-shaped piston on each end of each piston rod with its closed end facing outward away from the cam on which the piston rod is journalled;

a fuel gas inlet passage entering each cylinder intermediate its ends;

means to direct fuel gas to said passage entering each cylinder;

said passage being covered by the piston in that cylinder except when the piston is in proximity to its outermost position in the cylinder;

each cylinder having an exhaust passage leaving the cylinder intermediate its ends;

said exhaust passage being covered by the piston in that cylinder except when the piston is in proximity to its innermost position in the cylinder;

a fuel gas passage extending radially through each piston adjacent its outer end;

each cylinder having a channel in its interior wall extending lengthwise of the cylinder and circumferentially aligned with the said fuel gas passage in the piston therein to bypass fuel gas from such fuel gas passage into the outer end portion of the cylinder while the piston is in its innermost position in the cylinder and the exhaust passage of the cylinder is uncovered.

2. The device defined in claim 1 wherein said means to direct fuel to said passage includes a rotating storage chamber adjacent to the crank case.

3. The device defined in claim 1 wherein each cylinder has a gas ignition device in its outer end; and the casing has actuating means thereon to actuate each gas ignition device as it rotates past said actuating means.

4. The device defined in claim 1 wherein the casing has an exhaust gas outlet; and the cylinders carry a shield cooperating with the exhaust passages from the cylinders to direct exhaust gases from all the passages to said outlet.

5. The device defined in claim 1 wherein said crankcase has seals around the piston rods entering it from the cylinders impeding fluid flow between the interior of the crankcase and the interiors of said cylinder.

6. The device defined in claim 1 wherein the only driving connection between the camshaft and the cylinders is through the cam and piston assemblies.

7. The device defined in claim 1, wherein the casing has an exhaust gas outlet and cooling air inlet and outlet means, and shielding means are provided within the casing to prevent mingling of the exhaust gases with the cooling air within the casing.

References Cited

UNITED STATES PATENTS

| | | |
|---|---|---|
| 1,089,645 | 3/1914 | Jenkins. |
| 1,114,816 | 10/1914 | Stapp. |
| 2,683,422 | 7/1954 | Richards _____ 123—44 XR |
| 3,258,992 | 7/1966 | Hittell. |

ALLAN D. HERRMANN, Primary Examiner

U.S. Cl. X.R.

123—56, 73